(12) United States Patent
Dubs et al.

(10) Patent No.: US 6,448,208 B1
(45) Date of Patent: Sep. 10, 2002

(54) LIQUID POLYFUNCTIONAL ADDITIVES

(75) Inventors: Paul Dubs, Cham; Roger Martin, Rheinfelden; Samuel Evans, Marly; Stephan Allenbach, Sisseln; Marc Ribeaud, Delémont, all of (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 09/622,707

(22) PCT Filed: Feb. 16, 1999

(86) PCT No.: PCT/EP99/01000

§ 371 (c)(1), (2), (4) Date: Aug. 21, 2000

(87) PCT Pub. No.: WO99/43762

PCT Pub. Date: Sep. 2, 1999

(30) Foreign Application Priority Data

Feb. 25, 1998 (CH) .................................. 449/98

(51) Int. Cl.$^7$ .................... C10M 159/16; C10M 107/46
(52) U.S. Cl. ................ 508/229; 508/222; 508/272; 508/276; 508/284; 508/322; 252/404; 252/405; 252/406; 44/330; 554/2
(58) Field of Search ................... 508/229, 222, 508/272, 276, 284, 322; 252/404, 406, 405; 44/330; 554/2

(56) References Cited

U.S. PATENT DOCUMENTS

| | | | |
|---|---|---|---|
| 3,839,278 A | 10/1974 | Dexter et al. | 260/45.85 |
| 4,032,562 A | 6/1977 | Dexter et al. | 260/473 |
| 4,058,502 A | 11/1977 | Dexter et al. | 260/45.85 |
| 4,093,587 A | 6/1978 | Spivack | 260/45.8 |
| 4,101,550 A | 7/1978 | Spivack | 544/387 |
| 4,132,702 A | 1/1979 | Schmidt et al. | 260/45.8 |
| 5,155,244 A | 10/1992 | Greene et al. | 554/2 |
| 5,380,890 A | 1/1995 | Greene et al. | 554/2 |
| 5,478,875 A | 12/1995 | Dubs et al. | 524/291 |
| 5,663,128 A | 9/1997 | Evans et al. | 508/331 |
| 5,668,206 A | * 9/1997 | Dubs et al. | 524/291 |
| 5,820,777 A | * 10/1998 | Schnur et al. | 252/68 |
| 6,046,263 A | 4/2000 | Rasberger et al. | 524/284 |
| 6,296,677 B1 | * 10/2001 | Ribeaud et al. | 44/308 |

FOREIGN PATENT DOCUMENTS

| | | |
|---|---|---|
| GB | 2325239 | 11/1998 |
| GB | 2325472 | 11/1998 |
| GB | 2325672 | 12/1998 |

* cited by examiner

Primary Examiner—Jacqueline V. Howard
(74) Attorney, Agent, or Firm—Kevin T. Mansfield; Tyler A. Stevenson

(57) ABSTRACT

A description is given of products obtainable by reacting components a), b), c) and, if desired, d), where component a) is a compound of the formula I or a mixture of compounds of the formula I, component b) is a compound of the formula II or a mixture of compounds of the formula II, component c) is a component of the formula IIIa and/or of the formula IIIb or a mixture of compounds of the formula IIIa and/or IIIb, and component d) is a compound of the formula IV or a mixture of compounds of the formula IV,

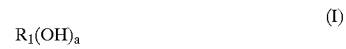

(I)

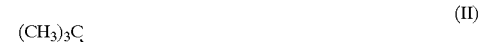

(II)

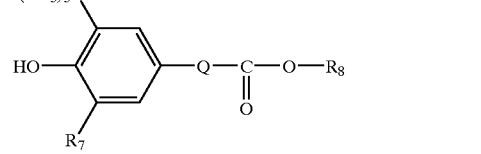

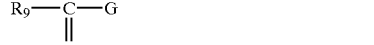

(IIIa)

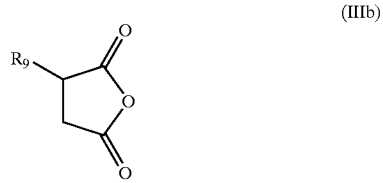

(IIIb)

(IV)

in which the general symbols are as defined therein, where the compound of the formula I is, for example, pentaerythritol, thiodiethylene glycol, 1,4-butanediol, 1,2-propanediol, diethylene glycol, triethylene glycol, 1,1,1-tris(hydroxymethyl)ethane, 2,2-dimethyl-1,3-propanediol or glycerol, the compound of the formula II is, for example, methyl 3-(3',5'-di-tert-butyl-4'-hydroxyphenyl)propionate or methyl 3-(3'-tert-butyl-4'-hydroxy-5'-methylphenyl)-propionate, the compound of the formula IIIa is, for example, methyl pelargonate or methyl laurate and the compound of the formula IIIb is, for example, 2-dodecenylsuccinic anhydride, and the compound of the formula IV is, for example, $C_8$–$C_{30}$alkylbenzene or an alkane of 12 to 30 carbon atoms. These products can be employed as liquid antioxidants in fuels and polymers and as antifriction additives in lubricants.

35 Claims, No Drawings

LIQUID POLYFUNCTIONAL ADDITIVES

This is a 371 of PCT/EP99/01000 Feb. 16, 1999

The present invention relates to novel liquid polyfunctional additives of low volatility, to compositions comprising an organic material, preferably a fuel or lubricant, or a polymer, and the said additives, and to the use thereof and the method of stabilizing organic materials against oxidative, thermal or light-induced degradation, and for reducing friction.

The stabilization, especially that of lubricants or plastics, with antioxidants from the series of the sterically hindered phenols or their reaction products with other compounds is known, for example, from U.S. Pat. Nos. 3,839,278, 4,032,562, 4,058,502, 4,093,587, 4,132,702, 5,478,875 and EP-A-0 644 195.

WO 91/13134 describes a method of improving the solubility of antioxidants in a second medium.

U.S. Pat. No. 5,380,890 discloses stabilizer mixtures in which the antioxidant active group amounts only to up to 20 per cent by weight. Such stabilizer mixtures, however, in some cases have the feature that they crystallize out after 2 to 3 weeks at room temperature and are therefore no longer flowable. There is therefore a need for stabilizer mixtures having a higher proportion of antioxidant active group and a better stability on storage, so that the product is still pumpable in the liquid state even after weeks.

There is likewise a search for compounds which combine their stabilizing properties with a friction-reducing effect. This additional property is achieved by means of free aliphatic OH groups, which bind the compound to the metallic (for example) surface to be protected and so position themselves between the surfaces at risk of frictional wear.

The present invention relates to a product obtainable by reacting components a), b), c) and, if desired, d), where component a) is a compound of the formula I or a mixture of compounds of the formula I component b) is a compound of the formula II or a mixture of compounds of the formula II, component c) is a component of the formula IIIa and/or of the formula IIIb or a mixture of compounds of the formula IIIa and/or IIIb, and component d) is a compound of the formula IV or a mixture of compounds of the formula IV, $$R_1(OH)_a \quad (I)$$

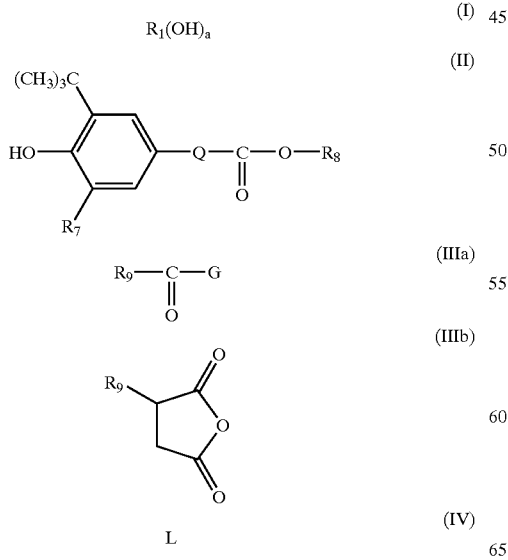

where in the compound of the formula I
a is the integer 1, 2, 3, 4 or 6, and
if a is 1
$R_1$ is $C_4$–$C_{30}$alkyl or —$CH_2CH_2$—T—$(CH_2CH_2O)_b R_2$, and
b is an integer from the range from 0 to 30, and
T is oxygen, sulfur or

where
$R_2$ is $C_1$–$C_{18}$ or

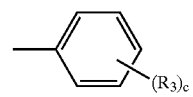

and
$R_3$ is hydrogen or $C_1$–$C_{18}$alkyl, and
c is an integer from the range from 0 to 3, or
if a is 2
$R_1$ is —$C_dH_{2d}$—, —$CH_2$—CH=CH—$CH_2$—, —$CH_2$—C≡C—$CH_2$—,

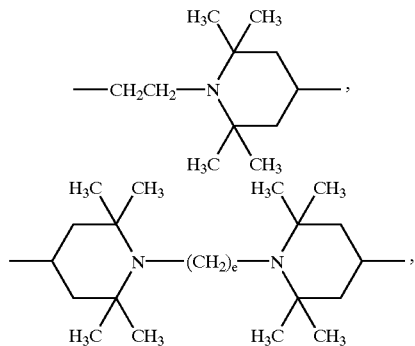

—$CH_2CH_2$—T—$(CH_2CH_2O)_b$—$CH_2CH_2$— or

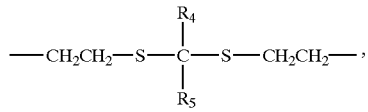

where b and T are as defined above, and
d and e are an integer from the range from 2 to 6, and
$R_4$ and $R_5$ independently of one another are hydrogen, $C_1$–$C_{18}$alkyl or phenyl, or
if a is 3
$R_1$ is $C_3$–$C_{10}$alkanetriyl or

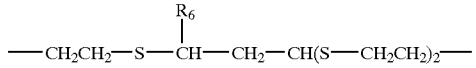

and
$R_6$ is hydrogen or methyl, or
if a is 4

$R_1$ is $C_4$–$C_{10}$alkanetetrayl,

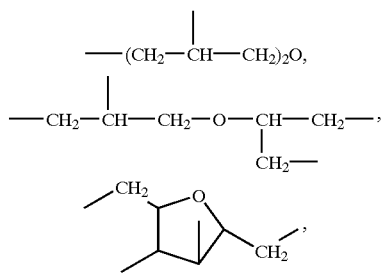

or —$(CH_2CH_2—S)_2CH—CH(S—CH_2CH_2)_2$— or
if a is 6
$R_1$ is

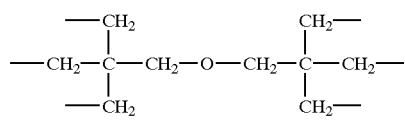

and in the compound of the formula II
$R_7$ is hydrogen, methyl or tert-butyl, and
$R_8$ is hydrogen or $C_1$–$C_{30}$alkyl, and
Q is —$CH_2CH_2$—,

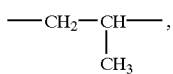

—$CH_2$—S—$C_fH_{2f}$— or

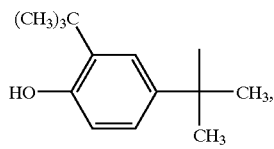

where
f is 1 or 2, and in the compound of the formula IIIa and IIIb
G is chlorine, bromine or —$OR_{10}$,
$R_9$ is hydrogen, $C_1$–$C_{30}$alkyl, $C_4$–$C_{30}$alkenyl, phenyl, $C_7$–$C_9$phenylalkyl, $C_5$–$C_{12}$cycloalkyl, $C_8$–$C_{22}$hydroxyalkyl, $C_8$–$C_{22}$hydroxyalkenyl,

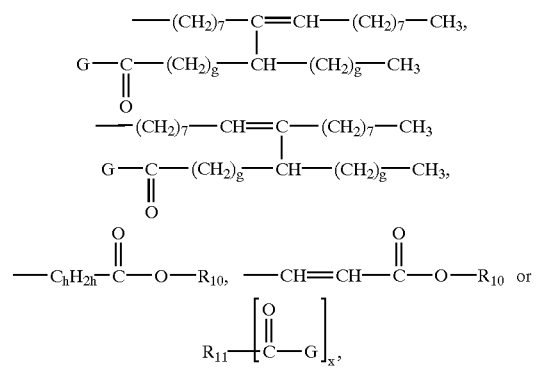

$R_{10}$ is hydrogen, $C_1$–$C_{18}$alkyl, $C_8$–$C_{30}$alkenyl, $C_5$–$C_{12}$cycloalkyl, phenyl or $C_7$–$C_9$phenylalkyl, g is 7 or 8,
h is an integer from the range from 2 to 8,
x is 3 or 4, and
if x is 3
$R_{11}$ is $C_3$–$C_{18}$alkanetriyl or $C_6$–$C_8$cycloalkanetriyl, and
if x is 4
$R_{11}$ is $C_4$–$C_{18}$alkanetetrayl or $C_6$–$C_8$cycloalkanetetrayl, and in the compound of the formula IV
L is sulfur, $R_{12}$—SH,

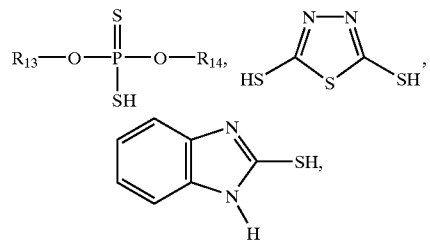

$C_{12}$–$C_{30}$alkane or

where
$R_{12}$ is $C_1$–$C_{18}$alkyl, $C_7$–$C_{24}$phenylalkyl, phenyl, $C_7$–$C_{24}$alkylphenyl, or unsubstituted or $C_1$–$C_4$-alkyl-substituted $C_5$–$C_{12}$cycloalkyl; and
$R_{13}$ and $R_{14}$ independently of one another are $C_1$–$C_{18}$alkyl, or unsubstituted or $C_1$–$C_{18}$alkyl-substituted phenyl, and
$R_{15}$ is $C_8$–$C_{30}$alkyl.

The liquid and low-volatility products of the present invention are notable for very good stabilization of organic materials, such as fuels, polymers or oils, against oxidative, thermal and light-induced degradation.

Alkyl of up to 30 carbon atoms is a branched or unbranched radical such as methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl, eicosyl, docosyl or pentacosyl. One of the preferred definitions of $R_1$ is for example $C_8$–$C_{18}$alkyl, of $R_4$ and $R_5$ $C_1$–$C_{13}$alkyl, of $R_7$ tert-butyl, of $R_8$ hydrogen or methyl, of $R_9$ $C_7$–$C_{20}$alkyl and of $R_{13}$ and $R_{14}$ isopropyl or isooctyl.

Cycloalkyl of up to 12 carbon atoms is for example cyclopentyl, cyclohexyl, cycloheptyl, cyclooctyl, cyclodecyl or cyclododecyl. One of the preferred definitions of $R_9$, $R_{10}$ and $R_{12}$ is $C_5$–$C_7$cycloalkyl. Cyclohexyl is particularly preferred.

Unsubstituted or $C_1$–$C_4$alkyl-substituted $C_5$–$C_{12}$cycloalkyl is for example cyclopentyl, methylcyclopentyl, dimethylcyclopentyl, cyclohexyl, methylcyclohexyl, dimethylcyclohexyl, trimethylcyclohexyl, tert-butylcyclohexyl, cycloheptyl or cyclooctyl. $C_5$–$C_8$cycloalkyl is preferred, especially cyclohexyl and tert-butylcyclohexyl.

Alkenyl of up to 30 carbon atoms is for example vinyl, propenyl, isopropenyl, 2-butenyl, 3-butenyl, isobutenyl, n-penta-2,4-dienyl, 3-methylbut-2-enyl, n-oct-2-enyl, n-dodec-2-enyl, isododecenyl, oleyl, n-octadec-2-enyl or n-octadec-4-enyl. One of the preferred definitions of $R_9$ is for example $C_{12}$–$C_{24}$alkenyl.

Hydroxyl-substituted $C_8$–$C_{22}$alkyl is a branched or unbranched radical containing preferably 1 to 3, especially 1 or 2, OH groups, such as 8-hydroxyoctyl, 7-hydroxyoctyl, 6-hydroxyoctyl, 5-hydroxyoctyl, 4-hydroxyoctyl, 3-hydroxyoctyl, 2-hydroxyoctyl, 9-hydroxynonyl, 10-hydroxydecyl, 11-hydroxyundecyl, 12-hydroxydodecyl, 13-hydroxytridecyl, 14-hydroxytetradecyl, 15-hydroxypentadecyl, 16-hydroxyhexadecyl, 17-hydroxyheptadecyl, 18-hydroxyoctadecyl, 20-hydroxyeicosyl or 22-hydroxydocosyl. A preferred definition of $R_9$ is hydroxyl-substituted $C_8$–$C_{20}$alkyl, especially hydroxyl-substituted $C_8$–$C_{12}$alkyl.

Phenylalkyl of 7 to 9 carbon atoms is for example benzyl, α-methylbenzyl, α,α-dimethylbenzyl or 2-phenylethyl. Benzyl is preferred.

$C_1$–$C_{18}$alkyl-substituted phenyl, which contains preferably 1 to 3, especially 1 or 2, alkyl groups, is for example o-, m- or p-methylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 2-methyl-6-ethylphenyl, 4-tert-butylphenyl, 2-ethylphenyl, 2,6-diethylphenyl, butylphenyl, pentylphenyl, hexylphenyl, heptylphenyl, octylphenyl, nonylphenyl, decylphenyl, undecylphenyl or dodecylphenyl. $C_1$–$C_{12}$alkyl-substituted phenyl is preferred, especially $C_4$–$C_8$alkyl-substituted phenyl.

Alkanetriyl of 3 to 18 carbon atoms is for example

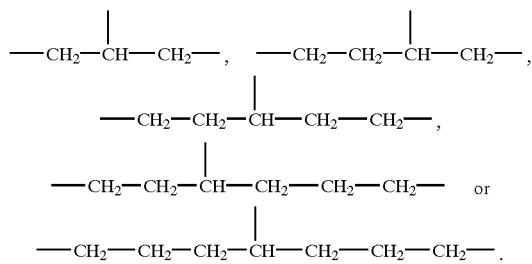

Glyceryl is preferred.

Alkanetetrayl of 4 to 18 carbon atoms is for example

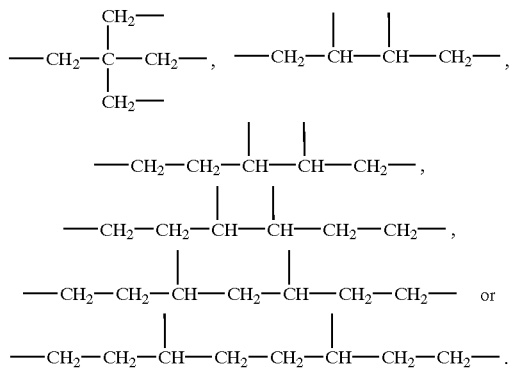

Pentaerythrityl is preferred.

The reaction of the four components a), b), c) and d) with one another to form the products of the present invention can take place in any desired sequence.

Preferably, the four components a), b), c) and d) are introduced initially and reacted simultaneously.

Alternatively, component d) can be added to reaction mixtures a) and b), b) and c) or a) and c), and the missing fourth component can then be reacted.

A particularly preferred embodiment is the addition of the component d) after the reaction of the three components a), b) and c).

The reaction is judiciously conducted in the presence of a catalyst. Particularly suitable catalysts are Lewis acids or bases.

Examples of suitable basic catalysts are metal hydrides, metal alkylides, metal arylides, metal hydroxides, metal alkoxides, metal phenoxides, metal amides and metal carboxylates.

Examples of preferred metal hydrides are lithium hydride, sodium hydride and potassium hydride.

Examples of preferred metal alkylides are butyllithium and methyllithium.

A preferred metal arylide is for example phenyllithium.

Examples of preferred metal hydroxides are lithium hydroxide, sodium hydroxide, potassium hydroxide, caesium hydroxide, rubidium hydroxide, magnesium hydroxide, calcium hydroxide, barium hydroxide and aluminium hydroxide.

A particularly preferred metal hydroxide is for example potassium hydroxide.

Examples of preferred metal alkoxides are lithium methoxide, sodium methoxide, sodium ethoxide, potassium methoxide, potassium ethoxide, sodium isopropoxide and potassium tert-butoxide. These can be employed in pure form or as a solution.

A particularly preferred metal alkoxide is for example lithium methoxide.

Preferred metal phenoxides are for example sodium phenoxide and potassium phenoxide.

Examples of preferred metal amides are sodium amide and lithium amide.

Examples of preferred metal carboxylates are calcium acetate and calcium salicylate.

A particularly preferred metal carboxylate is overbased calcium salicylate.

Examples of suitable Lewis acid catalysts are

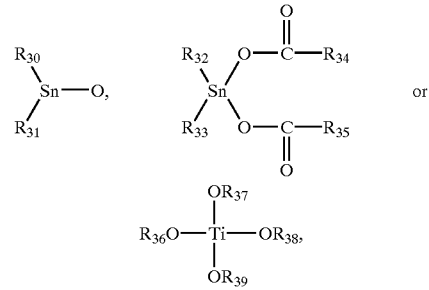

$R_{30}$, $R_{31}$, $R_{32}$, $R_{33}$, $R_{34}$, $R_{35}$, $R_{36}$, $R_{37}$, $R_{38}$ and $R_{39}$ are for example independently of one another $C_1$–$C_{18}$alkyl or phenyl. $C_1$–$C_8$alkyl is preferred. A particularly preferred Lewis acid catalyst is dibutyltin oxide.

In a two-stage reaction regime it is also possible to employ different catalysts.

The catalyst is added to components a), b), c) and, if present, d) in an amount, for example, of from 0.03 to 20 parts per thousand by weight, preferably in an amount of from 0.1 to 10 parts per thousand by weight, based on the sum of the weight of components a), b) and c). Particular preference is given to the addition of from 1 to 10 parts per thousand by weight of SAP®-001.

The reaction can also be performed in the presence of a catalyst which is adsorbed on a support and which as its active material comprises an alkali metal compound of the formula V $$M_vAn \quad\quad (V)$$

where

M is Li, Na, K, Rb or Cs, v is the valency of An and

An is a fluoride, hydroxide, phosphate, formate, acetate or —$OR_{40}$ radical, and $R_{40}$ is alkyl of 1 to 4 carbon atoms or a phenoxide radical, and as its support comprises an alkaline material which has a pH of more than 10 measured in 10% by weight aqueous suspension and is selected from one or more substances from the series consisting of the alkaline earth metal oxides, hydroxides, aluminates and silicates.

The support substances from the series of the said alkaline earth metal compounds can be present in hydrated or anhydrous form, the hydrated forms being preferred.

Judicious supported catalysts are those comprising the oxides, hydroxides, aluminates or silicates of the alkaline earth metals Mg, Ca, Sr and Ba, or mixtures thereof, as supports.

Particularly judicious supports are the compounds MgO, Mg(OH)$_2$, CaO, Ca(OH)$_2$, BaO, Ba(OH)$_2$, Ba(OH)$_2$.8H$_2$O, calcined dolomite MgO—CaO, calcined and hydrated dolomite MgCa(OH)$_4$, calcined barytocalcite BaO—CaO, calcined and hydrated barytocalcite BaCa(OH)$_4$, spinel MgAl$_2$O$_4$, MgAl$_2$O$_4$.nH$_2$O, CaAl$_2$O$_4$, CaAl$_2$O$_4$.nH$_2$O, hydrocalumite 2Ca(OH)$_2$.Al(OH)$_3$.nH$_2$O, Ca$_2$SiO$_4$, hillebrandite Ca$_2$SiO$_4$.H$_2$O, foshagite and mixtures thereof.

Preference is given as the support to CaO, MgO or a mixture of these prepared, for example, by burning dolomite CaCO$_3$.MgCO$_3$.

The support substances are preferably essentially free from iron; that is, the content of iron, alone or in the form of its compounds, should judiciously not exceed 10 ppm. Overall, the support materials should also be of great purity with respect to further metals, such as copper, lead and other heavy metals, for example. The copper content should judiciously be below 10 ppm, as should the content of heavy metals—for example, the lead content below 10 ppm, and the total content (all heavy metals) below 40 ppm.

The supports are also preferably substantially free from carbonate groups. It is judicious to keep to a carbonate content of below 0.1% by weight. Oxygen-transferring anions, such as MnO$_4^-$, CrO$_4^-$, AsO$_4^{3-}$, NO$_3^-$ for example should judiciously be present in amounts of no more than 100 ppm each, judiciously not more than 200 ppm in total. Active oxygen must judiciously not exceed 100 ppm. Strongly acidic anions, such as SO$_4^{2-}$ or Cl$^-$, should judiciously be present in amounts of not more than 500 ppm each and judiciously not more than 1000 ppm in total.

Judicious supported catalysts are those comprising as their active material the hydroxides or fluorides of the alkali metals Na, K, Rb or Cs.

The preferred active material is KOH, KF, NaOH, NaF or CsF, with particular preference being given to KOH or KF.

The proportion of the active material is, for example, from 0.15 to 30% by weight, based for purposes of calculation on the anhydrous support. For calculation purposes the percentage is based on the corresponding alkali metal ion alone, i.e. without taking into account the respective anion, whereas the figure for the support relates to the support as a whole.

Judiciously, from 0.15 to 10% by weight of active material is provided, and in a preferred embodiment there is from 1 to 10% by weight of active material, based in each case on the alkali metal ion and on the anhydrous support.

The reaction of components a), b) and c) can be conducted in component d) as a solvent, an example being Norpar® Ex 15 or Exxsol® D-110 (from EXXON) or Marlican® (linear alkylbenzene from HÜLS AG). Preferably, the reaction of components a) and b) and c) is conducted without solvent. The solvent and the component d), for example Exxsol® D-110, is added subsequently.

The reaction temperature is, for example, between 100 and 250° C. The reaction is preferably conducted within a temperature range from 120 to 200° C.; the range from 130° C. to 190° C. is particularly preferred.

Insofar as they are not available commercially, components a), b) and c) can be prepared by known methods or in analogy to such methods. Possible preparation methods for the compounds of the formula III can be found, for example, in the following publications: GB-A-0 996 502, U.S. Pat. Nos. 3,330,859, 3,944,594, 4,593,057, EP-A-0 154 518 and U.S. Pat. No. 3,960,928.

The invention preferably provides products where in the compound of the formula I if a is 1

$R_1$ is $C_8$–$C_{18}$alkyl, or if a is 2

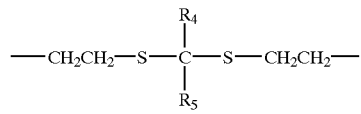

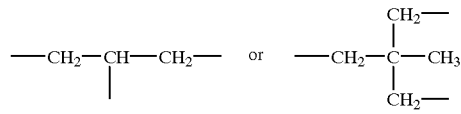

where b is an integer from the range from 0 to 6 and

T is oxygen or sulfur and $R_4$ and $R_5$ independently of one another are hydrogen or $C_1$–$C_{13}$alkyl, and $R_4$ is additionally phenyl, or if a is 3

$R_1$ is

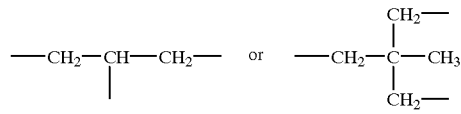

or if a is 4, $R_1$ is C(CH$_2$—)$_4$.

The invention particularly preferably provides products where in the compound of the formula II $R_7$ is methyl or tert-butyl and $R_8$ is hydrogen or methyl and Q is —CH$_2$CH$_2$—.

In formula II, $R_7$ is preferably tert-butyl.

The invention also preferably provides products where in the compound of the formula IIa and the compound of the formula IIIb G is —OCH$_3$ and $R_9$ is $C_7$–$C_{20}$alkyl, $C_{12}$–$C_{24}$alkenyl, $C_8$–$C_{22}$hydroxyalkyl or $C_8$–$C_{22}$hydroxyalkenyl.

The invention, in addition preferably provides products where in the compound of the formula IV
L is sulfur,

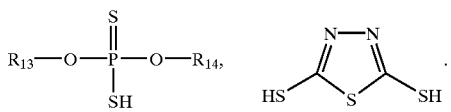

or C$_{18}$alkane, where

R$_{13}$ and R$_{14}$ independently of one another are isopropyl or isooctyl.

The invention also particularly preferably provides products where the compound of the formula I is pentaerythritol, thiodiethylene glycol, 1,4-butanediol, 1,2-propanediol, diethylene glycol, triethylene glycol, 1,1,1-tris(hydroxymethyl)ethane, 1,1,1-tris(hydroxymethyl)propane, 2,2-dimethyl-1,3-propanediol or glycerol, the compound of the formula 11 is methyl 3-(3',5'-di-tert-butyl-4'-hydroxyphenyl)propionate or methyl 3-(3'-tert-butyl-4'-hydroxy-5'-methylphenyl)propionate, the compound of the formula IIIa is methyl pelargonate or methyl laurate and the compound of the formula IIIb is 2-dodecenylsuccinic anhydride, and the compound of the formula IV is an alkane of 12 to 18 carbon atoms.

Examples of particularly preferred compounds of the formula I are pentaerythritol, glycerol, diglycerol, 1,1,1-tris(hydroxymethyl)ethane, 1,1,1-tris(hydroxymethyl)propane, 2,2-dimethyl-1,3-propanediol and thiodiethylene glycol.

A very particularly preferred compound of the formula I is glycerol.

Preferred compounds of the formula lila are methyl pelargonate and methyl laurate.

A preferred compound of the formula IIIb is 2-dodecenylsuccinic anhydride.

Preferred compounds of the formula IV are alkanes of 12 to 18 carbon atoms.

The components a), b), c) and, if present, d) are judiciously in a molar ratio of from 0.1: 0.1:1:0.1 to 15:30:1:10. Preference is given to a molar ratio of from 1:1:1:0.5 to 10:1:20:10. Particular preference is given to a molar ratio of from 1:1:2:2 to 10:1:20:10.

The products of the invention may comprise, for example, from 10 to 95% by weight, preferably from 30 to 80% by weight and, in particular, from 50 to 65% by weight of the active group E-1

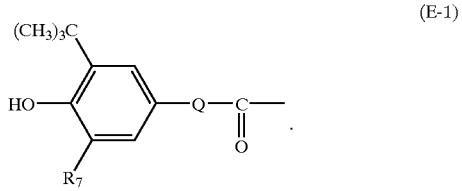

(E-1)

Particularly judicious products are those obtainable by reacting components a) and c) with methyl 3-(3',5'-di-tert-butyl-4'-hydroxyphenyl)propionate and a C$_{12}$–C$_{18}$alkane.

The present invention also provides products obtainable by reacting components a), b) and c), where all three components are introduced initially and reacted simultaneously. Catalysts, proportions and reaction conditions correspond, mutatis mutandis, to those given above for the first subject of the invention.

The proportions of compounds of the formula I to II and III should be chosen such that the number of free OH groups of the compounds of the formula I when used, for example, as an additive in lubricants lies within the range from 0.01 to 4.0 equivalents, preferably in the range from 0.1 to 3.0 equivalents and, with particular preference, in the range from 0.1 to 2.5 equivalents per kilogram of product.

As already mentioned, the products of the invention are particularly suitable for stabilizing organic materials against oxidative, thermal or light-induced degradation. Attention is drawn in particular to their outstanding action as antioxidants in the stabilization of organic material.

Examples of such materials are:

1. Polymers of monoolefins and diolefins, for example polypropylene, polyisobutylene, polybut-1-ene, poly-4-methylpent-1-ene, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, preferably polyethylene and polypropylene, can be prepared by different, and especially by the following, methods:

a) radical polymerisation (normally under high pressure and at elevated temperature).

b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and their copolymers with carbon monoxide or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

4. Hydrocarbon resins (for example $C_5$–$C_9$) including hydrogenated modifications thereof (e.g. tackifiers) and mixtures of polyalkylenes and starch.

5. Polystyrene, poly(p-methylstyrene), poly(a-methylstyrene).

6. Copolymers of styrene or α-methylstyrene with dienes or acrylic derivatives, for example styrene/butadiene, styrene/acrylonitrile, styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.

7. Graft copolymers of styrene or a-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

8. Halogen-containing polymers such as polychloroprene, chlorinated rubbers, chlorinated and brominated copolymer of isobutylene-isoprene (halobutyl rubber), chlorinated or sulfochlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

9. Polymers derived from α,β-unsaturated acids and derivatives thereof such as polyacrylates and polymethacrylates; polymethyl methacrylates, polyacrylamides and polyacrylonitriles, impact-modified with butyl acrylate.

10. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.

12. Homopolymers and copolymers of cyclic ethers such as polyalkylene glycols, polyethylene oxide, polypropylene oxide or copolymers thereof with bisglycidyl ethers.

13. Polyacetals such as polyoxymethylene and, those polyoxymethylenes which contain ethylene oxide as a comonomer; polyacetals modified with thermoplastic polyurethanes, acrylates or MBS.

14. Polyphenylene oxides and sulfides, and mixtures of polyphenylene oxides with styrene polymers or polyamides.

15. Polyurethanes derived from hydroxyl-terminated polyethers, polyesters or polybutadienes on the one hand and aliphatic or aromatic polyisocyanates on the other, as well as precursors thereof.

16. Polyamides and copolyamides derived from diamines and dicarboxylic acids and/or from aminocarboxylic acids or the corresponding lactams, for example polyamide 4, polyamide 6, polyamide 6/6, 6/10, 619, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).

17. Polyureas, polyimides, polyamide-imides, polyetherimids, polyesterimids, polyhydantoins and polybenzimidazoles.

18. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate and polyhydroxybenzoates, as well as block copolyether esters derived from hydroxyl-terminated polyethers; and also polyesters modified with polycarbonates or MBS.

19. Polycarbonates and polyester carbonates.

20. Polysulfones, polyether sulfones and polyether ketones.

21. Crosslinked polymers derived from aldehydes on the one hand and phenols, ureas and melamines on the other hand, such as phenol/formaldehyde resins, urea/formaldehyde resins and melamine/formaldehyde resins.

22. Drying and non-drying alkyd resins.

23. Unsaturated polyester resins derived from copolyesters of saturated and unsaturated dicarboxylic acids with polyhydric alcohols and vinyl compounds as crosslinking agents, and also halogen-containing modifications thereof of low flammability.

24. Crosslinkable acrylic resins derived from substituted acrylates, for example epoxy acrylates, urethane acrylates or polyester acrylates.

25. Alkyd resins, polyester resins and acrylate resins crosslinked with melamine resins, urea resins, isocyanates, isocyanurates, polyisocyanates or epoxy resins.

26. Crosslinked epoxy resins derived from aliphatic, cycloaliphatic, heterocyclic or aromatic glycidyl compounds, e.g. products of diglycidyl ethers of bisphenol A and bisphenol F, which are crosslinked with customary hardeners such as anhydrides or amines, with or without accelerators.

27. Natural polymers such as cellulose, rubber, gelatin and chemically modified homologous derivatives thereof, for example cellulose acetates, cellulose propionates and cellulose butyrates, or the cellulose ethers such as methyl cellulose; as well as rosins and their derivatives.

28. Blends of the aforementioned polymers (polyblends), for example PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

29. Naturally occurring and synthetic organic materials which are pure monomeric compounds or mixtures of such compounds, for example mineral oils, animal and vegetable fats, oil and waxes, or oils, fats and waxes based on synthetic esters (e.g. phthalates, adipates, phosphates or trimellitates) and also mixtures of synthetic esters with mineral oils in any weight ratios, typically those used as spinning compositions, as well as aqueous emulsions of such materials.

30. Aqueous emulsions of natural or synthetic rubber, e.g. natural latex or latices of carboxylated styrene/butadiene copolymers.

The invention additionally provides compositions comprising an organic material sensitive to oxidative, thermal or light-induced degradation and at least one product obtainable by reacting components a), b), c) and, if used, d), and provides for the use of these products for stabilizing organic material against oxidative, thermal or light-induced degradation.

The invention therefore also embraces a method of stabilizing organic material against thermal, oxidative or light-induced degradation which comprises adding to this material at least one product obtainable by reacting components a), b), c) and, if used, d).

Of particular interest is the use of these products as antioxidants in organic materials.

Preferred organic materials are polymers, e.g. synthetic polymers, and especially thermoplastic polymers. Particularly preferred organic materials are polyolefins and styrene copolymers, such as those indicated above in sections 1 to 3 and in sections 6 and 7, especially polyethylene and polypropylene, and also ABS and styrene-butadiene copolymers. The invention therefore preferably provides compositions in which the organic material is a synthetic organic polymer or a mixture of such polymers, especially a polyolefin or a styrene copolymer.

In general, the products are added to the material to be stabilized in amounts from 0.01 to 10%, preferably from 0.01 to 5% and, in particular, from 0.01 to 2%, based on the overall weight of the material to be stabilized. Particular preference is given to the use of the products of the invention in amounts from 0.01 to 0.5%, especially from 0.05 to 0.3%.

The invention also provides compositions comprising α) an organic material subject to oxidative, thermal or light-induced degradation and β) at least one product of the invention.

Component α) can be an oxygen-containing or non-oxygen hydrocarbon fuel, a lubricant, a hydraulic fluid, a metalworking fluid or a synthetic polymer. Mixtures of the respective components α) are also possible.

As already mentioned, the products of the invention [component (β)] also possess wear- and corrosion-inhibiting properties in fuels. Particular mention should be made of the outstanding increase which they bring about in the lubricity (antiwear properties) of fuels with a low sulfur and/or aromatics content.

The present invention therefore also provides for the use of the products of component (β) as antiwear additives in an engine fuel system.

In general, the products of component (β) are added in an amount from 0.0001 to 10%, preferably from 0.001 to 5%, and in particular, from 0.005 to 1%, based on the weight of component (α), to the fuel.

The products of component (β) can also be mixed with liquid carriers that are compatible with the end-product fuels in order to produce concentrates which can subsequently be added to base fuels or formulated fuels. Such concentrates may facilitate the mixing, combination, pouring or transfer (en masse or in units/portions) of the products of component (β).

The carriers are customarily organic solvents for the products of component (β), examples being hydrocarbons such as xylene or toluene, ethers, alcohols or mixtures thereof, or they can be constituents of the base fuels or of the formulated fuels which are desired as end products. The addition of the concentrates to the base materials of formulated fuels in order to obtain end-product fuels can be made batchwise: for example, from unit containers with concentrates that are obtainable from retail outlets or other points of sale; or by metered additions in refineries or fuel distribution outlets. Other modes of addition are likewise possible.

The products of component (β) may be present in different amounts in the concentrate, depending on the desired properties of the concentrate, such as its viscosity. A suitable amount in the carrier medium, in general, is from approximately 10 to 90% by weight, more usually from approximately 20 to 50% by weight, of the products of component (β).

The end-product fuels can be hydrocarbons, oxygen-containing compounds or mixtures thereof. The hydrocarbon fractions which can be used for the fuel compositions include distillate fuels whose boiling points are in the kerosine and gas-oil range (165 to 565° C.). Customary middle-distillate fuels of this kind include road diesel and other diesel oils having boiling points in the range from 200 to 370° C., and also jet fuels, kerosines, gas-oil and cycle oils. Middle-distillate fuels of this kind can be straight-run distillate oils, catalytically or thermally cracked distillate fuel oils, or mixtures of straight-run combustion oils/heavy oils/heating oils/oils, naphthas and similar materials with cracked distillate materials. These fuels are normally derived from petroleum, but may also derive at least in part from other sources, examples being shale, tar sands, coal, lignite, biomass and the like. The fuels may include a proportion of oxygen-containing co-components, for example alcohols or ethers, including methyl tert-butyl ether (MTBE). The fuels may also comprise in their entirety oxygen-containing compounds such as methanol and/or ethanol. Also suitable are those fuels which have been subjected to conventional treatment processes, for example a treatment with an acid or base, hydrogenation, solvent refining, or an earthing treatment.

Of particular interest are compositions in which component (α) is a diesel fuel.

The fuels can be employed, for example, in the operation of jet, motor-vehicle, gas turbine or diesel engines. In one preferred embodiment of this invention a fuel is used which is suitable for use in a diesel engine.

The composition of these diesel fuels is highly variable, in accordance with the nature of the crude oil, the refining process, the components with which the crude oil is mixed, and the climate in which the fuel is to be sold. As noted earlier above, this invention is employed primarily in the diesel fuels of reduced sulfur content and/or aromatics content which are produced nowadays to comply with local statutory requirements/regulations. These fuels normally have a sulfur content of less than 500 ppm (0.05%) and/or an aromatics content of less than 35% by weight.

Consequently, compositions of particular interest include those in which component (α) is a fuel which contains less than 0.10% by weight, preferably less than 0.05% by weight and, in particular, less than 0.01% by weight of sulfur.

The composition of the fuel, and hence also its inherent lubricity, can vary in accordance with the level of requirements of the local statutory regulations.

The invention is also employed in aviation fuels, for example in those which generally are used in jet turbine engines. Fuels of this kind have a composition close to that of the diesel oils with a low content of aromatics and of sulfur. The addition of the products of component (β) according to the invention to these fuels may reduce wear in the engine.

The invention can also be employed in lead-free or reformed automotive fuels which are now generally used in aircraft piston engines and in motor vehicles. The addition of the products of component (β) to these fuels may improve engine performance, and makes it possible to employ the fuel in place of leaded fuels, in use for example in aircraft piston engines where leaded fuel is currently used.

Therefore, the present invention also provides a method of reducing wear in an engine fuel system, which comprises adding a product of component (β) to the fuel.

In addition to the products of component (β) the compositions of the invention may also include conventional additives which are added in order to improve still further the basic properties of the fuel, as is described in the handbook "Lubricant and Fuel Additives", Kline & Company Inc., International Business Consultants, Fairfield, N.J., USA, pages 309–320 (1990). These additives include: antioxidants, metal passivators, rust inhibitors, viscosity improvers, pour-point depressants, dispersants, detergents, high-pressure additives, friction-reducing additives, anti-wear additives, demulsifiers, cloud-point depressants, wax-like antisettling additives, antistatic additives, defoamers, evaporation additives, biocides, odour masks, colorants, ignition accelerators, antifreezes, antiknock additives, conductivity improvers, PFI/IVD purity additives, and other lubricity additives.

In addition to the product, the compositions of the invention may also include conventional additives such as those indicated below, for example.

1. Antioxidants 1.1. Alkylated monophenols, for example 2,6-di-tert-butyl-4-methylphenol, 2-tert-butyl-4,6-di-methylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methylundec-1'-yl) phenol, 2,4-dimethyl-6-(1'-methylheptadec-1'-yl)phenol, 2,4-dimethyl-6-(1'-methyltridec-1'-yl)phenol and mixtures thereof.

1.2. Alkylthiomethylghenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkvlated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis-(3,5-di-tert-butyl-4-hydroxyphenyl)adipate.

1.4. Tocopherols, for example α-tocopherol, β-tocopherol, δ-tocopherol, 6-tocopherol and mixtures thereof (Vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis-(3,6-di-sec-amylphenol), 4,4'-bis(2,6-dimethyl-4-hydroxyphenyl)disulfide.

1.6. Alkylidenebisphenols, for example 2,2'-methylenebis (6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis-(2,6-di-tert-butylphenol), 4,4'-methylenebis (6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl)butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis-(3,5-di-tert-butyl-4-hydroxyphenyl)propane, 2,2-bis-(5-tert-butyl-4-hydroxy2-methylphenyl)-4-n-dodecylmercaptobutane, 1,1,5,5-tetra-(5-tert-butyl-4-hydroxy-2-methylphenyl)pentane.

1.7. O-, N- and S-benzyl compounds, for example 3,5,3', 5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

1.8. Hydroxybenzylated malonates, for example dioctadecyl-2,2-bis-(3,5-di-tert-butyl-2-hydroxybenzyl)-malonate, di-octadecyl-2-(3-tert-butyl-4-hydroxy-5-methylbenzyl)-malonate, di-dodecylmercaptoethyl-2,2-bis-(3,5-di-tert-butyl-4-hydroxybenzyl)malonate, bis[4-(1,1,3, 3-tetramethylbutyl)phenyl]-2,2-bis(3,5-di-tert-butyl-4-hydroxybenzyl)malonate.

1.9. Aromatic hydroxybenzyl compounds, for example 1,3,5-tris-(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine Compounds, for example 2,4-bis (octylmercapto)-6-(3,5-di-tert-butyl-4-hydroxyanillino)-1, 3,5-triazine, 2-octylmercapto-4,6-bis(3,5-di-tert-butyl-4-hydroxyanilino)-1,3,5-triazine, 2-octylmercapto-4,6-bis(3, 5-di-tert-butyl-4-hydroxyphenoxy)-1,3,5-triazine, 2,4,6-tris- (3,5-di-tert-butyl-4-hydroxyphenoxy)-1,2,3-triazine, 1,3,5-tris-(3,5-di-tert-butyl-4-hydroxybenzyl)isocyanurate, 1,3,5-tris(4-tert-butyl-3-hydroxy-2,6-dimethylbenzyl) isocyanurate, 2,4,6-tris-(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzytphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3.5-di-tert-butyl-4-hydroxyphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis-(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.15. Esters of β-(3.5-dicyclohexyl-4-hydroxyphenyl) propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl1-phospha-2,6,7-trioxabicyclo[2.2.2]octane. 1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl) propionic acid e.g. N,N'-bis(3,5-di-tert-butyl-4-hydroxyphenylpropionyl)hexamethylenediamide, N,N'-bis(3,5-di-tert-butyl-4-hydroxyphenylpropionyl) trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugard®XL-1 supplied by Uniroyal).

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenlenediamine, 4-(p-toluenesulfamoyl)diphenylamine, N,N'-dimethyl-N,N'-di-sec-butyl-p-phenylenediamine, diphenylamine, N-allyidiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyidiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyidiphenylamines, a mixture of mono- and dialkylated isopropyl/isohexyldiphenylamines, a mixture of mono- und dialkylated tert-butyidiphenylamines, 2,3-dihydro-3,3-dimethyl-4H-1,4benzothiazine, phenothiazine, a mixture of mono- und dialkylated tert-butyl/-tert-actylphenothiazines, a mixture of mono- und dialkylated tert-octyl-phenothiazines, N-allylphenothiazine, N,N,N',N'-tetraphenyl-1,4-diaminobut-2-ene, N,N-bis(2,2,6,6-tetramethylpiperid-4-yl-hexamethylenediamine, bis(2,2,6,6-tetramethylpiperid-4-yl) sebacate, 2,2,6,6-tetramethylpiperidin-4-one, 2,2,6,6-tetramethylpiperidin-4-ol.

2. UV Absorbers and Light Stabilisers 2.1. 2-(2'-Hydroxyphenyl)benzotriazoles, for example 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl- 2'-hydroxy-5'-methylphenyl)-5-chloro-benzotriazole, 2-(3'-sec-butyl-5'-tert-butyl-2'-hydroxyphenyl) benzotriazole, 2-(2'-hydroxy-4'-octyloxyphenyl) benzotriazole, 2-(3',5'-di-tert-amyl-2'-hydroxyphenyi) benzotriazole, 2-(3',5'-bis-(α,α-dimethylbenzyl)-2'-hydroxyphenyl)benzotriazole, 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl) phenyl)-5-chloro-benzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl) benzotriazole, 2-(3'-tert-butyl-5'-[2-(2-ethylhexyloxy) carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl) phenylbenzotriazole, 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H- benzotriazole with polyethylene glycol 300; [R—CH$_2$CH$_2$—COO—CH$_2$CH$_2$-]$_2$, where R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)-phenyl]benzotriazole; 2-[2'-hydroxy-3'-(1,1,3,3-tetramethylbutyl)-5'-(α,α-dimethylbenzyl)-phenyl]benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives. 2.3. Esters of substituted and unsubstituted benzoic acids, as for example 4-tertbutyl-phenyl salicylate, phenyl salicylate, octylphenyl salicylate, dibenzoyl resorcinol, bis(4-tert-butylbenzoyl) resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxy-cinnamate, butyl α-cyano-β-methyl-p-methoxy-cinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thio-bis-[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenyl undecylketoxime, nickel complexes of 1-phenyl-4-lauroyl-5-hydroxypyrazole, with or without additional ligands.

2.6. Sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl) sebacate, bis(1-octyloxy-2,2,6,6-tetramethyl-4-piperidyl) sebacate, bis(1,2,2,6,6-pentamethyl-4-piperidyl)n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl) nitrilotriacetate, tetrakis(2,2,6,6-tetramethyl-4-piperidyl)-1,2,3,4-butane-tetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decan-2,4-dione, bis(1-octyloxy-2,2,6,6-tetramethylpiperidyl) sebacate, bis(1-octyloxy-2,2,6,6-tetramethylpiperidyl) succinate, linear or cyclic condensates of N,N'-bis-(2,2,6,6-tetramethyl-4-piperidyl)hexamethylenediamine and 4-morpholino-2,6-dichloro-1,3,5-triazine, the condensate of 2-chloro-4,6-bis(4-n-butylaminio-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis-(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl) pyrrolidin-2,5-dione, 3-dodecyl-1-(1,2,2,6-pentamethyl-4-piperidyl)pyrrolidine-2,5-dione, a mixture of 4-hexadecyloxy- and 4-stearyloxy-2,2,6,6-tetramethylpiperidine, a condensation product of N,N'-bis(2,2,6,6-tetramethyl-4-piperidyl)hexamethylenediamine and 4-cyclohexylamino-2,6-dichloro-1,3,5-triazine, a condensation product of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); N-(2,2,6,6-tetramethyl-4-piperidyl)-n-dodecylsuccinimid, N-(1,2,2,6,6-pentamethyl-4-piperidyl)-n-dodecylsuccinimid, 2-undecyl-7,7,9,9-tetramethyl-1-oxa-3,8-diaza-4-oxo-spiro[4,5]decane, a reaction product of 7,7,9,9-tetramethyl-2-cycloundecyl-1-oxa-3,8-diaza-4-oxospiro [4,5]decane und epichlorohydrin, 1,1-bis(1,2,2,6,6-pentamethyl-4-piperidyloxycarbonyl)-2-(4-piperidyloxycarbonyl)-2-(4-methoxyphenyl)ethene, N,N'-bis-formyl-N,N'-bis(2,2,6,6-tetramethyl-4-piperidyl)hexamethylenediamine, diester of 4-methoxy-methylene-malonic acid with 1,2,2,6,6-pentamethyl-4-hydroxypiperidine, poly[methylpropyl-3-oxy-4-(2,2,6,6-tetramethyl-4-piperidyl)]siloxane, reaction product of maleic acid anhydride-α-olefin-copolymer with 2,2,6,6-tetramethyl-4-aminopiperidine or 1,2,2,6,6-pentamethyl-4-aminopiperidine.

2.7. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilicies and mixtures of o- and p-ethoxy-disubstituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxy-propoxy)phenyl]-4,6-bis(2,4-dimethyl)-1,3,5-triazine, 2-[2-hydroxy-4-(2-hydroxy3-octyloxy-propoxy)phenyl]-4,6-bis(2,4-dimethyl)-1,3,5-triazine, 2-[4-(dodecyloxy/tdecyloxy-2-hydroxypropoxy)-2-hydroxy-phenyl]-4,6-bis(2,4-dimethylphenyl)-1,2,5-triazine, 2-[2-hydroxy-4-(2-hydroxy-3-dodecyloxy-propoxy)phenyl]-4,6-bis(2,4-dimethylphenyl)-1,3,5-triazine, 2-(2-hydroxy-4-hexyloxy) phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxy-propoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine.

3. Metal deactivators, for example N,N'-diphenyloxamide, N-salicylal-N'-salicyloyl hydrazine, N,N'-bis(salicyloyl hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl) oxalyl dihydrazide, N,N'-bis(salicyloyl)thiopropionyl dihydrazide.

4. Phosrhites and DhosDhonites, for example triphenyl phosphite, diphenyl alkyl phosphites, phenyl dialkyl phosphites, tris(nonylphenyl)phosphite, trilauryl phosphite, trioctadecyl phosphite, distearyl pentaerythritol diphosphite, tris(2,4-di-tert-butylphenyl)phosphite, diisodecyl pentaerythritol diphosphite, bis(2,4-di-tert-butylphenyl) pentaerythritol diphosphite, bis(2,6-di-tert-butyl-4-methylphenyl)-pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butylphenyl)4,4'-biphenylene diphosphonite, 6-isooctyloxy-2,4,8,10-tetra-tert-butyl-12H-dibenz-[d,g]-1,3,2-dioxaphosphocin, bis(2,4-di-tert-butyl-6-methylphenyl)methyl phosphite, bis(2,4-di-tert-butyl-6-methylphenyl)ethyl phosphite, 6-fluoro-2,4,8,10-tetra-tert-butyl-12-methyl-di-benz[d,g]1,3,2-dioxaphosphocin, 2,2',2"-nitrilo[triethyltris(3,3', 5,5'-tetra-tert-butyl-1,1'-biphenyl-2,2'-diyl)phosphite], 2-ethylhexyl (3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane.

Especially preferred are the following phosphites:
Tris(2,4-di-tert-butylphenyl)phosphite (Irgafos®168, Ciba-Geigy), tris(nonylphenyl)phosphite,

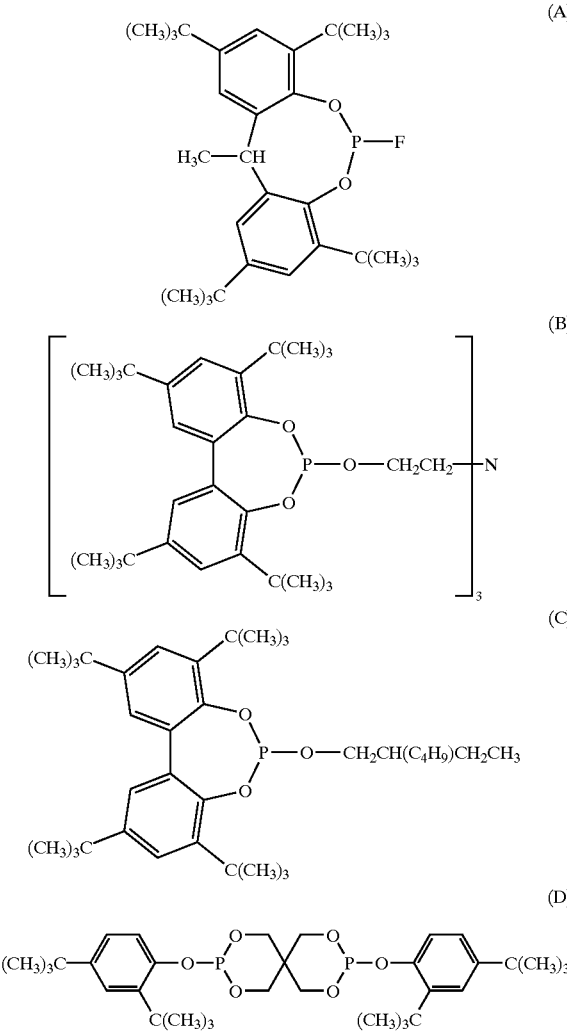

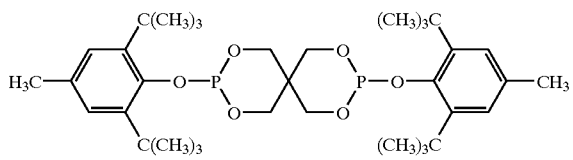

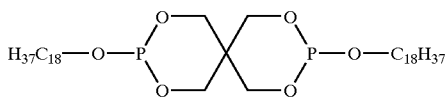

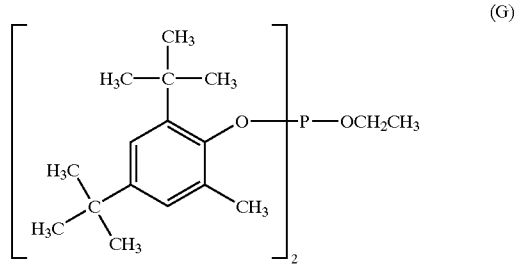

5. Hydroxylamines, for example, N,N-dibenzylhydroxylamine, N,N-diethythydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

6. Nitrones, for example, N-benzyl-alpha-phenyl-nitrone, N-ethyl-alpha-methyl-nitrone, N-octyl-alpha-heptyl-nitrone, N-lauryl-alpha-undecyl-nitrone, N-tetradecyl-alpha-tridcyl-nitrone, N-hexadecyl-alpha-pentadecyl-nitrone, N-octadecyl-alpha-heptadecyl-nitrone, N-hexadecyl-alpha-heptadecyl-nitrone, N-ocatadecyl-alpha-pentadecyl-nitrone, N-heptadecyl-alpha-heptadecyl-nitrone, N-octadecyl-alpha-hexadecyl-nitrone, nitrone derived from N,N-dialkylhydroxylamine derived from hydrogenated tallow amine.

7. Thiosyneraists, for example, dilauryl thiodipropionate or distearyl thiodipropionate.

8. Peroxide scavengers, for example esters of P-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

9. Polyamide stabilisers, for example, copper salts in combination with iodides and/or phosphorus compounds and salts of divalent manganese.

10. Basic co-stabilisers, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example calcium stearate, zinc stearate, magnesium behenate, magnesium stearate, sodium ricinoleate and potassium palmitate, antimony pyrocatecholate or zink pyrocatecholate.

11. Nucleating agents, for example, inorganic substances such as talcum, metal oxides such as titanium dioxide or magnesium oxide, phosphates, carbonates or sulfates of, preferably, alkaline earth metals; organic compounds such as mono- or polycarboxylic acids and the salts thereof, e.g.

4-tert-butylbenzoic acid, adipic acid, diphenylacetic acid, sodium succinate or sodium benzoate; polymeric compounds such as ionic copolymers (ionomers). Especially preferred are 1,3:2,4-bis(3',4'-dimethylbenzylidene)sorbitol, 1,3:2,4-di(paramethyidibenzylidene)sorbitol, und 1,3:2,4-di(benzylidene)sorbitol.

12. Fillers and reinforcing agents, for example, calcium carbonate, silicates, glass fibres, glass bulbs, asbestos, talc, kaolin, mica, barium sulfate, metal oxides and hydroxides, carbon black, graphite, wood flour and flours or fibers of other natural products, synthetic fibers.

13. Other additives, for example, plasticisers, lubricants, emulsifiers, pigments, rheology additives, catalysts, flow-control agents, optical brighteners, flameproofing agents, antistatic agents and blowing agents.

14. Benzofuranones and indolinones, for example those disclosed in U.S. Pat. Nos. 4,325,863; 4,338,244; 5,175,312; 5,216,052; 5,252,643; DE-A-4316611; DE-A-4316622; DE-A-4316876; EP-A-0589839 or EP-A-0591102 or 3-[4-(2-acetoxyethoxy)phenyl]-5,7-di-tert-butyl-benzofuran-2-one, 5,7-di-tert-butyl-3-[4-(2-stearoyloxyethoxy)phenyl]benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butyl-benzofuran-2-one, 3-(3,5-dimethyl-4-pivaloyloxyphenyl)-5,7-di-tert-butyl-benzofuran-2-one, 3-(3,4-dimethylphenyl)-5,7-di-tert-butyl-benzofuran-2-one, 3-(2,3-dimethylphenyl)-5,7-di-tert-butyl-benzofuran-2-one.

The conventional additives are added, for example, in concentrations of from 0.01 to 10%, based on the overall weight of the material to be stabilized.

The products and any further additives can be incorporated into the organic material in accordance with known methods. Incorporation into the materials can take place, for example, by mixing in the products and any other additives, or applying them, by methods customary in the art. Where the materials are polymers, especially synthetic polymers, incorporation can take place before or during the shaping operation, or by applying the dissolved or dispersed products to the polymers, with or without subsequent evaporation of the solvent. In the case of elastomers, these can also be stabilized as latices. A further possibility for incorporating the products of the invention into polymers is to add them before, during or directly after the polymerization of the corresponding monomers, or prior to crosslinking. The products of the invention can in this case be added as they are or else in encapsulated form (for example, in waxes, oils or polymers). If they are added before or during polymerization, the products of the invention can also act as chain length regulators for the polymers (chain terminators). The products of the invention can also be added in the form of a masterbatch comprising, for example, a concentration of from 2.5 to 25% by weight of these products to the materials that are to be stabilized.

The materials which have been stabilized in this manner can be employed in a multitude of forms: for example, in the form of films, fibres, tapes, moulding compounds or sections, or as binders for coating materials, adhesives or cements.

Preference is given to compositions of the invention comprising α) a lubricant, a hydraulic fluid, a metalworking fluid or a fuel, for example for driving engines of the 4-stroke Otto, 2-stroke, diesel, Wankel and Orbital type, and β) at least one product of the invention.

Particularly preferred lubricants are the mineral oils, the synthetic oils, or mixtures thereof.

The products known per se are used from the series of the lubricants, the hydraulic fluids and the metalworking fluids.

The lubricants and hydraulic fluids which are suitable are familiar to those skilled in the art and are described, for example, in Dieter Klamann "Schmierstoffe und verwandte Produkte", Verlag Chemie, Weinheim, 1982, in Schewe-Kobek, "Das Schmiermittel-Taschenbuch", Dr. Alfred H üthig-Verlag, Heidelberg, 1974, oder in "Ullmanns Encyklopädie der technischen Chemie", volume 13, pages 85–94 (Verlag Chemie, Weinheim, 1977).

Examples of these are lubricants and hydraulic fluids based on mineral oil, or synthetic lubricants or hydraulic fluids, especially those which are derivatives of carboxylic esters and are used at temperatures of 200° C. or more.

Examples of synthetic lubricants embrace lubricants based on a diester of a dibasic acid with a monovalent alcohol, for example dioctyl sebacate or dinonyl adipate, on a triester of trimethylolpropane with a monobasic acid or with a mixture of such acids, for example trimethylolpropane tripelargonate, trimethylolpropane tricaprylate or mixtures thereof, on a tetraester of pentaerythritol with a monobasic acid or with a mixture of such acids, such as pentaerythrityl tetracaprylate, or on a complex ester of monobasic and dibasic acids with polyhydric alcohols, such as a complex ester of trimethylolpropane with caprylic and sebacic acids, or of a mixture thereof.

Particularly suitable examples besides mineral oils are poly-α-olefins, ester-based lubricants, phosphates, glycols, polyglycols and polyalkylene glycols, and mixtures of these with water.

The products of the invention are oils and are readily soluble in lubricants, and therefore particularly suitable as additives to lubricants, and mention should be made of their surprisingly good antioxidative and anticorrosive action.

For example, in lubricants for combustion engines, for example in combustion engines operating in accordance with the Otto principle, the products of the invention are able to display their surprising properties. For instance, in lubricating oils the products of the invention prevent the formation of deposits (sludge) or reduce these deposits to a surprising extent.

So-called masterbatches/blends/premixes can also be prepared.

Even when using very small amounts, the products of the invention are active as additives in lubricants. They are admixed to the lubricants judiciously in amounts from 0.01 to 5% by weight, preferably in an amount from 0.05 to 3% by weight and, with particular preference, in an amount from 0.1 to 2% by weight, based in each case on the lubricant.

The lubricants may additionally comprise other additives which are added to improve the basic properties of lubricants still further; they include: antioxidants, metal passivators, rust inhibitors, viscosity index improvers, pour-point depressants, dispersants, detergents, high-pressure additives, antifriction additives and antiwear additives.

A series of such compounds can be found, for example, in the above list "1. Antioxidants", especially sections 1.1 to 1.16. In addition, the following further additives should be mentioned by way of example:

Example of Amine Antioxidants

N,N'-Diisopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-di(naphthyl-2)-p- phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfonamido)-diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-phenyl-2-naphthylamine, octylated diphenylamine, e.g. p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, di(4-methoxyphenyl)amine, 2,6-di-tert-butyl-4-dimethylaminomethylphenol, 2,4'-diaminodiphenylmethane, 4,4'-diaminodiphe4nylmethane, N,N,N',N'-tetramethyl-4,4'-diaminodiphenylmethane, 1,2-di[(2-methylphenyl)amino]ethane, 1,2-di(phenylamino)propane, (o-tolyl)-biguanide, di[4-(1',3'-dimethylbutyl)phenyl]amine, tert-octylated N-phenyl-1-naphthylamine, a mixture of mono- and dialkylated tert-butyl/tert-octyidiphenylamines, a mixture of mono- and dialkylated isopropyl/isohexyldiphenylamines, mixtures of mono- and dialkylated tert-butyldiphenylamines, 2,3-dihydro-3,3-dimethyl-4H-1,4-benzothiazine, phenothiazine, N-allylphenothiazine, N,N,N',N'-tetraphenyl-1,4-diaminobut-2-ene, N,N-bis(2,2,6,6-tetramethylpiperidin-4-yl)hexamethylenediamine, bis(2,2,6,6-tetramethylpiperidin-4-yl)sebacate, 2,2,6,6-tetramethylpiperidin-4-one, 2,2,6,6-tetramethylpiperidin-4-ol.

Examples of Further Antioxidants

Aliphatic or aromatic phosphites, esters of thiodipropionic acid or of thiodiacetic acid, or salts of dithiocarbamic or dithiophosphoric acid, 2,2,12,12-tetramethyl-5,9-dihydroxy-3,7,11-trithiatridecane and 2,2,15,15-tetramethyl-5,12-dihydroxy-3,7,10,14-tetrathiahexadecane.

Examples of Metal Passivators e.g. for Copper, Are a) Benzotriazoles and their derivatives, e.g. 4- or 5-alkylbenzotriazoles (e.g. tolutriazole) and derivatives thereof, 4,5,6,7-tetrahydrobenzotriazole, 5,5'-methylenebisbenzoatriazole; Mannich bases of benzotriazole or tolutriazole, such as 1-[di(2-ethylhexyl)aminomethyl]tolutriazole and 1-[di(2-ethylhexyl)aminomethyl]benzotriazole; alkoxyalkylbenzotriazoles, such as 1-(nonyloxymethyl)benzotriazole, 1-(1-butoxyethyl)benzotriazole and 1-(1-cyclohexyloxybutyl)tolutriazole.

b) 1,2,4-Triazoles and their derivatives, e.g. 3-alkyl (or aryl)-1,2,4-triazoles, Mannich bases of 1,2,4-triazoles such as 1-[di(2-ethylhexyl)aminomethyl-1,2,4-triazole; alkoxyalkyl-1,2,4-triazoles, such as 1-(1-butoxyethyl)-1,2,4-triazole; acylated 3-amino-1,2,4-triazoles.

c) Imidazole derivatives, e.g. 4,4'-methylenebis(2-undecyl-5-methylimidazole, bis[(N-methyl)imidazol-2-yl]carbinol octyl ether.

d) Sulfur-containing heterocyclic compounds, e.g. 2-mercaptobenzothiazole, 2,5-dimercapto-1,3,4-thiadiazole and derivatives thereof; 3,5-bis[di(2-ethylhexyl)aminomethyl]-1,3,4-thiadiazolin-2-one.

e) Amino compounds, e.g. salicylidenepropylenediamine, salicylaminoguanidine and salts thereof.

Examples of Rust Inhibitors Are a) Organic acids, their esters, metal salts, amine salts and anhydrides, e.g. alkyl- and alkenylsuccinic acids and partial esters thereof with alcohols, diols or hydroxycarboxylic acids, partial amides of alkyl- and alkenylsuccinic acids, 4-nonylphenoxyacetic acid, alkoxy- and alkoxyethoxycarboxylic acids, such as dodecyloxyacetic acid, dodecyloxy(ethoxy)acetic acid and amine salts thereof, and also N-oleoylsarcosine, sorbitan monooleate, lead naphthenate, alkenylsuccinic anhydrides, e.g. dodecenylsuccinic anhydride, 2-carboxymethyl-1-dodecyl-3-methylglycerol and its amine salts.

b) Nitrogen-containing compounds, e.g.:
I. Primary, secondary or tertiary aliphatic or cycloaliphatic amines and amine salts of organic and inorganic acids, e.g. oil-soluble alkylammonium carboxylates, and also 1-[N,N-bis(2-hydroxyethyl)amino]-3-(4-nonylphenoxy)propan-2-ol.
II. Heterocyclic compounds, e.g. Substituted imidazolines and oxazolines, 2-heptadecenyl-1-(2-hydroxyethyl)imidazoline.

c) Phosphorus-containing compounds, e.g.:
Amine salts of phosphoric acid partial esters or phosphonic acid partial esters, zinc dialkyidithiophosphates.

d) Sulfur-containing compounds, e.g.: Barium dinonynaphthalenesulfonates, calcium petroleumsulfonates,alkylthio-substituted aliphatic carboxylic acids, esters of aliphatic 2-sulfocarboxylic acids and salts thereof.

e) Glycerol derivatives, e.g.:
Glyceryl monooleate, 1-(alkylphenoxy)-3-(2-hydroxyethyl)glycerols, 1-(alkylphenoxy)-3-(2,3-dihydroxypropyl)glycerols, 2-carboxyalkyl-1,3-dialkylglycerols.

Examples of Viscosity Index Improvers Are

Polyacrylates, polymethacrylates, vinylpyrrolidone-methacrylate copolymers, polyvinylpyrrolidones, polybutenes, olefin copolymers, styrene-acrylate copolymers, polyethers.

Examples of Pour-point Depressants Are

Polymethacrylate, alkylated naphthalene derivatives.

Examples of Dispersants/surfactants Are

Polybutenylsuccinamides or -imides, polybutenylphosphonic acid derivatives, basic magnesium, calcium and barium sulfonates and phenoxides.

Examples of Antiwear Additives Are

Sulfur- and/or phosphorus- and/or halogen-containing compounds, such as sulfurized olefins and vegetable oils, zinc dialkyldithiophosphates, alkylated triphenyl phosphates, tritolyl phosphate, tricresyl phosphate, chlorinated paraffins, alkyl and aryl di- and trisulfides, amine salts of mono- and dialkyl phosphates, amine salts of methylphosphonic acid, diethanolaminomethyltolyltriazole, di(2-ethylhexyl)aminomethyltolytriazole, derivatives of 2,5-dimercapto-1,3,4-thiadiazole, ethyl 3-[(bisisopropyloxyphosphinothioyl)thio]propionate, triphenyl thiophosphate (triphenyl phosphorothioate), tris(alkylphenyl)phosphorothioates and mixtures thereof, (e.g. tris(isononylphenyl)phosphorothioate), diphenyl mononyphenyl phosphorothioate, isobutylphenyl diphenyl phosphorothioate, dodecylamine salt of 3-hydroxy-1,3-thiaphosphetan 3-oxide, trithiophosphoric acid 5,5,5-tristisooctyl 2-acetate], derivatives of 2-mercaptobenzothiazole, such as 1-[N,N-bis(2-ethylhexyl)aminomethyl-2-mercapto-1H-1,3-benzothiazole, ethoxycarbonyl-5-octyidithiocarbamate.

Especially preferred additional additives in lubricants are amine antioxidants, especially mixtures of mono- and dialkylated tert-butyl/tert-octyldiphenylamines.

The examples which follow elucidate the invention further. Parts and percentages in the examples and in the remainder of the description are by weight, unless otherwise indicated.

| | |
|---|---|
| Norpar ® Ex 15 | n-paraffinic hydrocarbon mixture from EXXON [boiling range: 245–285° C.] |
| Exxsol ® D-110 | dearomatized aliphatic hydrocarbon mixture, partially hydrogenated, from EXXON [boiling range: 240–275° C.; $\overline{Mn}$ = 206 g mol$^{-1}$] |
| SAP ®-001 | overbased calcium salicylate from Shell |

PREPARATION EXAMPLES

Example 1
Preparation of the Liquid Antioxidant Derivative with Methyl Pelargonate and methyl 3-(3',5'-di-tert-butyl-4'-hydroxyphenyl)propionate and pentaerythritol A mixture of 48.24 g (0.280 mol) of methyl pelargonate and 14.02 g (0.103 mol) of pentaerythritol is charged to a sulfonation flask provided with reflux condenser and mechanical stirrer, 35.09 g (0.120 mol) of methyl 3-(3',5'-di-tert-butyl-4'-hydroxyphenyl)propionate and 0.92 g (1.0% by weight) of SAP®-001 are added, and the mixture is held under nitrogen at 180–190° C. for 18 to 19 hours. Cooling and filtration give 84.0 g (98% of theory) of product as a yellow oil with a refractive index $n_D^{20}$ of 1.4849 and 0.14 equivalents/kg of free alcoholic OH groups.

Example 2
Preparation of the Liquid Antioxidant Derivative with Methyl Pelargonate and methyl 3-(3',5'-di-tert-butyl-4'-hydroxyphenyl)propionate and glycerol A mixture of 31.01 g (0.180 mol) of methyl pelargonate and 13.74 g (0.149 mol) of glycerol is charged to a sulfonation flask provided with reflux condenser and mechanical stirrer, 52.64 g (0.180 mol) of methyl 3-(3',5'-di-tert-butyl-4'-hydroxyphenyl)propionate and 1.0 g (1.0% by weight) of SAP®-001 are added, and the mixture is held under nitrogen at 180–190° C. for 18 to 19 hours. Cooling and filtration give 84.32 g (99% of theory) of product as a yellow oil with a refractive index $n_D^{20}$ of 1.4966 and 1.0 equivalents/kg of free alcoholic OH groups.

Example 3
Preparation of the Liquid Antioxidant Derivative with Methyl Pelargonate and methyl 3-(3',5'-di-tert-butyl-4'-hydroxyphenyl)propionate, glycerol and Norpar® Ex 15

A mixture of 20.67 g (0.120 mol) of methyl pelargonate and 13.69 g (0.149 mol) of glycerol is charged to a sulfonation flask provided with reflux condenser and mechanical stirrer, 70.18 g (0.240 mol) of methyl 3-(3',5'-di-tert-butyl-4'-hydroxyphenyl)propionate and 1.1 g (1.0% by weight) of SAP®-001 are added, and the mixture is held under nitrogen at 180–190° C. for 18 to 19 hours. After the mixture has cooled, 23.06 g of Norpar® Ex 15 are added. Subsequent filtration gives 114.14 g (99% of theory) of product as a yellow oil with a refractive index $n_D^{20}$ of 1.4910 and 0.94 equivalents/kg of free alcoholic OH groups.

Example 4
Preparation of the Liquid Antioxidant Derivative with Methyl Pelargonate and methyl 3-(3',5'-di-tert-butyl-4'-hydroxyphenyl)propionate and 1,1,1-tris(hydroxymethyl)ethane A mixture of 82.69 g (0.480 mol) of methyl pelargonate and 28.84 g (0.240 mol) of 1,1,1-tris(hydroxymethyl)ethane is charged to a sulfonation flask provided with reflux condenser and mechanical stirrer, 70.18 g (0.240 mol) of methyl 3-(3',5'-di-tert-butyl-4'-hydroxyphenyl)propionate and 1.61 g (1.0% by weight) of dibutyltin oxide are added, and the mixture is held under nitrogen at 180–190° C. for 18 to 19 hours. Cooling and filtration give 155.74 g (97% of theory) of product as a yellow oil with a refractive index $n_D^{20}$ of 1.4853.

Example 5
Preparation of the Liquid Antioxidant Derivative with Methyl Pelargonate and methyl 3-(3',5'-di-tert-butyl-4'-hydroxyphenyl)propionate and 1,1,1-tris(hydroxymethyl)propane A mixture of 62.02 g (0.360 mol) of methyl pelargonate and 32.20 9 (0.240 mol) of 1,1,1-tris(hydroxymethyl)propane is charged to a sulfonation flask provided with reflux condenser and mechanical stirrer, 105.27 g (0.360 mol) of methyl 3-(3',5'-di-tert-butyl-4'-hydroxyphenyl)propionat and 1.8 g (1.0% by weight) of SAP®-001 are added, and the mixture is held under nitrogen at 180–190° C. for 18 to 19 hours. Cooling and filtration give 177.09 g (99% of theory) of product as a yellow oil with a refractive index $n_D^{20}$ of 1.4977.

Example 6
Preparation of the Liquid Antioxidant Derivative with Methyl Pelargonate and methyl 3-(3',5'-di-tert-butyl-4'-hydroxyphenyl)propionate and 2,2-dimethyl-1,3-propanediol A mixture of 41.34 g (0.240 mol) of methyl pelargonate and 25.00 g (0.240 mol) of 2,2-dimethyl-1,3-propanediol is charged to a sulfonation flask provided with reflux condenser and mechanical stirrer, 70.18 g (0.240 mol) of methyl 3-(3',5'-di-tert-butyl-4'-hydroxyphenyl)propionate and 1.2 g (1.0% by weight) of dibutyltin oxide are added, and the mixture is held under nitrogen at 180–190° C. for 18 to 19 hours. Cooling and filtration give 117.69 g (96% of theory) of product as a yellow oil with a refractive index $n_D^{20}$ of 1.4908.

Example 7
Preparation of the Liquid Antioxidant Derivative with Methyl Laurate and methyl 3-(3',5'-di-tert-butyl-4'-hydroxyphenyl)propionate and glycerol A mixture of 39.44 g (0.184 mol) of methyl laurate and 32.72 g (0.355 mol) of glycerol is charged to a sulfonation flask provided with reflux condenser and mechanical stirrer, 154.40 g (0.528 mol) of methyl 3-(3',5'-di-tert-butyl-4'-hydroxyphenyl)propionate and 2.10 g (1.0% by weight) of SAP®-001 are added, and the mixture is held under nitrogen at 180–190° C. for 18 to 19 hours. Cooling and filtration give 197.0 g (99% of theory) of product as a yellow oil of high viscosity with a refractive index $n_D^{20}$ of 1.5106 and 1.73 equivalents/kg of free alcoholic OH groups.

Example 8
Preparation of the Liquid Antioxidant Derivative with Methyl Pelargonate and methyl 3-(3',5'-di-tert-butyl-4'-hydroxyphenyl)propionate, glycerol and Exxsol® D-110

A mixture of 20.67 g (0.120 mol) of methyl pelargonate and 13.72 g (0.149 mol) of glycerol is charged to a sulfonation flask provided with reflux condenser and mechanical stirrer, 70.18 g (0.240 mol) of methyl 3-(3',5'-di-tert-butyl-4'-hydroxyphenyl)propionate and 1.1 g (1.0% by weight) of SAP®-001 are added, and the mixture is held under nitrogen at 180–190° C. for 18 to 19 hours. After the mixture has cooled, 23.06 g of Exxsol® D-110 are added. Subsequent filtration gives 114.23 g (99% of theory) of product as a yellow oil with a refractive index $n_D^{20}$ of 1.4937 and 0.94 equivalents/kg of free alcoholic OH groups.

Example 9
Preparation of the High-viscosity Antioxidant Derivative with Dodecenylsuccinic Anhydride and methyl 3-(3',5'-di-tert-butyl-4'-hydroxyphenyl)propionate and thioethylene glycol A mixture of 292.40 g (1.0 mol) of methyl 3-(3',5'-di-tert-butyl-4'-hydroxyphenyl)propionate and 363.6 g (3.0 mol) of thiodiethylene glycol in a sulfonation flask provided with descending condenser and mechanical stirrer is heated to an internal temperature of 130° C. 0.5 g of lithium amide is added, after which the mixture is left to react at 150° C. for six hours, with marked elimination of methanol. The orange-brown reaction mixture is taken up in 200 ml of toluene and the organic phase is washed with three times 200 ml of water and then dried over 15 g of sodium sulfate. The mixture is filtered and the filtrate is concentrated. The excess thiodiethylene glycol is removed under a high vacuum. This gives 382.2 g of a yellowish oil having a purity of 80% of theory according to GC.

239.1 g of the above intermediate are heated with 133.2 g of dodecenylsuccinic anhydride in a sulfonation flask to an internal temperature of 150° C. and the mixture is held at this temperature for 6 hours. After cooling, the reaction mixture is taken up in 300 ml of toluene and the organic phase is washed with twice 100 ml of water and then dried over 25 g of sodium sulfate. The mixture is filtered and the filtrate is concentrated. Drying takes place under a high vacuum. This gives 363.8 g of a brown resin.

Elemental analysis:

|   | calculated | found |
|---|---|---|
| C | 68.48% | 67.67% |
| H | 9.32% | 9.02% |
| S | 4.94% | 4.95% |

Example 10
Preparation of the Liquid Antioxidant Derivative with Dodecenylsuccinic Anhydride and methyl 3-(3',5'-di-tert-butyl-4'-hydroxyphenyl)propionate and diglycerol A mixture of 87.72 g (0.3 mol) of methyl 3-(3',5'-di-tert-butyl-4'-hydroxyphenyl)propionate and 16.1 g (0.1 mol) of diglycerol in a sulfonation flask provided with descending condenser and mechanical stirrer is heated to an internal temperature of 125° C. 0.1 g of lithium amide is added, after which the mixture is left to react at 160° C. for four hours, with marked elimination of methanol. Then 26.6 g (0.1 mol) of dodecenylsuccinic anhydride as a solution in 30 ml of toluene are added dropwise at 160° C. over the course of 20 minutes. The solvent is distilled off and the reaction mixture is held at 160° C. for a further hour. The brown reaction mixture is taken up in 200 ml of toluene and the organic phase is washed with three times 100 ml of water and then dried over 15 g of sodium sulfate. The mixture is filtered and the filtrate is concentrated. Drying takes place at 80° C. under a high vacuum. This gives 117.6 g of a brown oil.

Elemental analysis:

|   | calculated | found |
|---|---|---|
| C | 72.24% | 71.46% |
| H | 9.30% | 9.31% |

Example 11
Preparation of the Liquid Antioxidant Derivative with Dodecenylsuccinic Anhydride and methyl 3-(3'-tert-butyl-5'-methyl-4'-hydroxyphenyl)propionate and diglycerol A mixture of 75.1 g (0.3 mol) of methyl 3-(3'-tert-butyl-5'-methyl-4'-hydroxyphenyl)propionate and 16.1 g (0.1 mol) of diglycerol in a sulfonation flask provided with descending condenser and mechanical stirrer is heated to an internal temperature of 125° C. 0.1 g of lithium amide is added, after which the mixture is left to react at 160° C. for four hours, with marked elimination of methanol. Then 26.6 g (0.1 mol) of dodecenylsuccinic anhydride as a solution in 30 ml of toluene are added dropwise at 160° C. over the course of 20 minutes. The solvent is distilled off and the reaction mixture is held at 160° C. for a further hour. The brown reaction mixture is taken up in 200 ml of toluene and the organic phase is washed with three times 100 ml of water and then dried over 15 g of sodium sulfate. The mixture is filtered and the filtrate is concentrated. Drying takes place at 80° C. under a high vacuum. This gives 117.6 g of a brown oil.

Elemental analysis:

|   | calculated | found |
|---|---|---|
| C | 72.17% | 71.46% |
| H | 9.52% | 9.31% |

Example 12
Preparation of the Liquid Antioxidant Derivative with Methyl Pelargonate and methyl 3-(3',5'-di-tert-butyl-4'-hydroxyphenyl)propionate and glycerol A mixture of 31.01 g (0.180 mol) of methyl pelargonate and 14.21 g (0.154 mol) of glycerol is charged to a sulfonation flask provided with reflux condenser and a mechanical stirrer, 52.64 g (0.180 mol) of methyl 3-(3',5'-di-t-butyl-4'-hydroxyphenyl)propionate and 1.7 g (0.004 mol) of lithium methoxide solution (10%) are added, and the mixture is held under nitrogen at 180–190° C. for 14 hours. The reaction mixture is taken up in 80 ml of toluene, neutralized with aqueous citric acid and then washed with water. The organic phase is dried over sodium sulfate and isolated by filtration. Drying gives 80.3 g (95% of theory) of product with a refractive index $n_D^{20}$ of 1.4966.

Example A
Deposit and Oxidation Panel Test (DOPT)

The deposit and oxidation panel test (DOPT) is a variant of a test method for engine oils, in particular for diesel engine oils, which has been described by G. Abellaneda et al., IIIrd Symposium CEC, 1989, 61, New Cavendish Street, London W1M 8AR, England. It tests the suitability of the oils with stabilizer for preventing deposits on the piston.

The test duration is 20 hours, the panel temperature is 260° C. and the oil flow 1 ml/minute. The humid air atmosphere is enriched with 260 ppm of $NO_2$ and 26 ppm of $SO_2$. After the test, the metal panel onto which the oil drops is weighed and assessed visually. The lower the weight the better. The lubricating oil used is a commercial CD oil which is diluted with the basic oil STANCO 150®. The stabilizers of the invention are admixed in an amount of 1.6% by weight, based on the oil, to this prepared oil, which is then subjected to a DOPT test.

The results are summarized in Table 1.

TABLE 1

| Additive added to the base fluid | Concentration in % by weight | Weight increase (mg) | Visual assessment 0 = clean, 18 = dirty (demerit) |
|---|---|---|---|
| No additive | — | 164 | 18 |
| (1) | 1.6 | 114 | 16 |
| (2) | 1.6 | 95 | 15 |
| (6) | 1.6 | 131 | 16 |
| (7) | 1.6 | 107 | 14 |

The products of the invention exhibit a good stabilizing effect.

Example B
Reduction of Friction Losses in the So Called Elasto Hydrodynamic (EHD) Regime The test method has been described in great details in SAE 962037, page 87, written by S. Gunsel, M. Smeeth and H. Spikes.

For the measurement of the friction coefficient of the lubricants, a lubricated contact between a flat steel disk of controlled surface roughness (0.15+/−0.03 μm) and a 19 mm diameter steel ball (roughness 0.03+/−0.01 μm) is used. Both the disk and the ball are being rotated independently which allows to set a well control of the relative motion of rolling and sliding. Strain gauges are built in the driving systems and the recorded measurements of loads, speeds and torques allow a calculation of the friction coefficient as a function of load, sliding-rolling ratio, speed and temperature. The lower the friction coefficient of a lubricant the highest is its performance regarding fuel economy.

The results are summarized in Table 2.

TABLE 2

Measurement of friction losses

| Lube composition | | | | |
|---|---|---|---|---|
| Additive added to the base fluid | Concentration in % by weight | Friction coefficient at 3 entrainment speeds (mm/s) | | |
| | | 10 | 100 | 1000 |
| No additive | — | 0.160 | 0.130 | 0.080 |
| (1) | 0.67 | 0.134 | 0.106 | 0.064 |
| (2) | 0.67 | 0.126 | 0.098 | 0.062 |
| (6) | 0.67 | 0.138 | 0.112 | 0.064 |
| (7) | 0.67 | 0.120 | 0.098 | 0.062 |

Temperature = 80° C.; Load = 30 N; Sliding to rolling ratio: 50
Base fluid is a mineral oil, solvent neutral of the viscosity class VG 46.

It can be concluded from Tables 1 and 2 that the new components contribute to the stabilization of the lubricant, retarding the formation of degradation by-products and of deposits and that they also reduce friction losses in lubricated contacts. This is their contribution to fuel economy.

What is claimed is:

1. A product obtainable by reacting components a), b), c) and, if desired, d), where component a) is a compound of the formula I or a mixture of compounds of the formula I, component b) is a compound of the formula II or a mixture of compounds of the formula II, component c) is a component of the formula IIIa and/or of the formula IIIb or a mixture of compounds of the formula IIIa and/or IIIb, and component d) is a compound of the formula IV or a mixture of compounds of the formula IV,

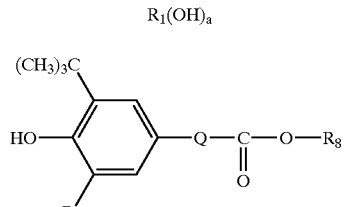

(I) $R_1(OH)_a$ (II)

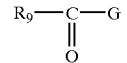

(IIIa) $R_9-\overset{\overset{\displaystyle O}{\|}}{C}-G$ (IIIb)

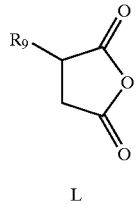

L (IV)

where in the compound of the formula I a is the integer 1, 2, 3, 4 or 6, and if a is 1

$R_1$ is $C_4$–$C_{30}$alkyl or —$CH_2CH_2$—T—$(CH_2CH_2O)_bR_2$, and b is an integer from the range from 0 to 30, and T is oxygen, sulfur or

where $R_2$ is $C_1$–$C_{18}$alkyl or

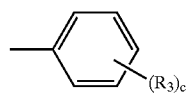

and $R_3$ is hydrogen or $C_1$–$C_{18}$alkyl, and c is an integer from the range from 0 to 3, or if a is 2

$R_1$ is —$C_dH_{2d}$—, —$CH_2$—CH=CH—$CH_2$—, —$CH_2$—C≡C—$CH_2$—,

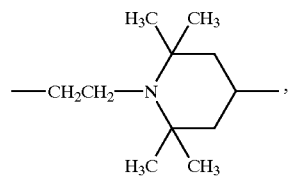

-continued

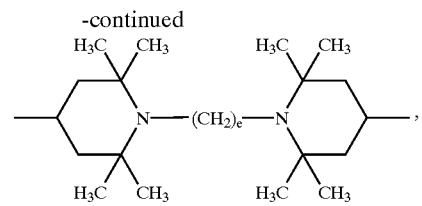

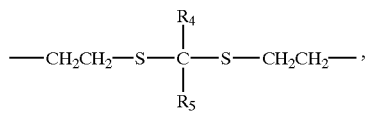

—CH$_2$CH$_2$—T—(CH$_2$CH$_2$O)$_b$—CH$_2$CH$_2$— or

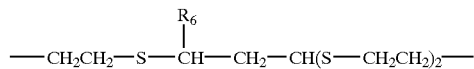

where b and T are as defined above, and d and e are an integer from the range from 2 to 6, and R$_4$ and R$_5$ independently of one another are hydrogen, C$_1$–C$_{18}$alkyl or phenyl, or if a is 3

R$_1$ is C$_3$–C$_{10}$alkanetriyl or

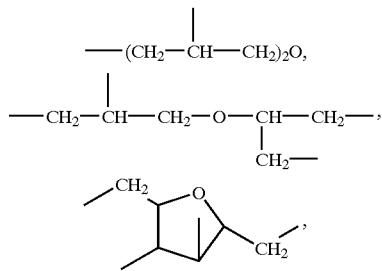

and

R$_6$ is hydrogen or methyl, or if a is 4

R$_1$ is C$_4$–C$_{10}$alkanetetrayl,

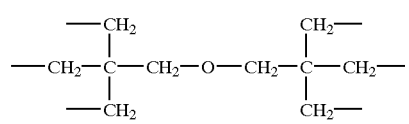

or —(CH$_2$CH$_2$—S)$_2$CH—CH(S—CH$_2$CH$_2$)$_2$— or if a is 6

R$_1$ is

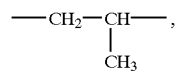

and in the compound of the formula II

R$_7$ is hydrogen, methyl or tert-butyl, and

R$_8$ is hydrogen or C$_1$–C$_{30}$alkyl, and

Q is —CH$_2$CH$_2$—,

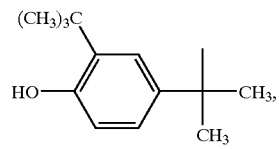

—CH$_2$—S—C$_f$H$_{2f}$— or

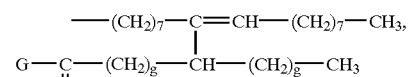

where f is 1 or 2, and in the compound of the formula IIIa and IIIb

G is chlorine, bromine or —OR$_{10}$,

R$_9$ is hydrogen, C$_1$–C$_{30}$alkyl, C$_4$–C$_{30}$alkenyl, phenyl, C$_7$–C$_9$phenylalkyl, C$_5$–C$_{12}$cycloalkyl, C$_8$–C$_{22}$hydroxyalkyl, C$_8$–C$_{22}$hydroxyalkenyl,

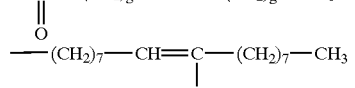

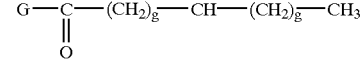

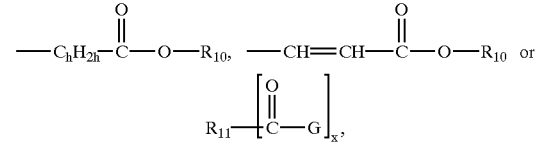

R$_{10}$ is C$_1$–C$_{18}$alkyl, C$_8$–C$_{30}$alkenyl, C$_5$–C$_{12}$cycloalkyl, phenyl or C$_7$–C$_9$phenylalkyl, g is 7 or 8, h is an integer from the range from 2 to 8, x is 3 or 4, and if x is 3

R$_{11}$ is C$_3$–C$_{18}$alkanetriyl or C$_6$–C$_8$cycloalkanetriyl, and if x is 4

R$_{11}$ is C$_4$–C$_{18}$alkanetetrayl or C$_6$–C$_8$cycloalkanetetrayl, and in the compound of the formula IV L is sulfur, R$_{12}$—SH,

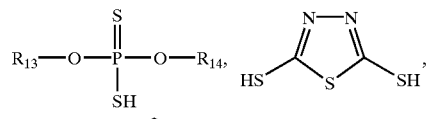

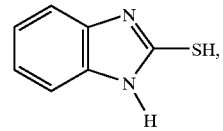

$C_{12}$–$C_{30}$alkane or

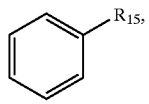

where $R_{12}$ is $C_1$–$C_{18}$alkyl, $C_7$–$C_{24}$phenylalkyl, phenyl, $C_7$–$C_{24}$alkylphenyl, or unsubstituted or $C_1$–$C_4$-alkyl-substituted $C_5$–$C_{12}$cycloalkyl; and $R_{13}$ and $R_{14}$ independently of one another are $C_1$–$C_{18}$alkyl, or unsubstituted or $C_1$–$C_{18}$alkyl-substituted phenyl, and $R_{15}$ is $C_8$–$C_{30}$alkyl, where the proportions of compounds of the formula I to II and III are chosen such that the number of free OH groups of the compounds of the formula I lies within the range from 0.01 to 4.0 equivalents per kilogram of product.

2. A product according to claim 1, where in the compound of the formula I if a is 1

$R_1$ is $C_8$–$C_{18}$alkyl, or if a is 2

$R_1$ is —$C_dH_{2d}$—, —$CH_2CH_2$—T—$(CH_2CH_2O)_b$—$CH_2CH_2$— or

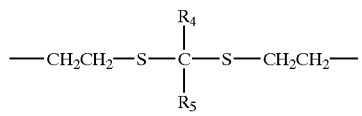

where b is an integer from the range from 0 to 6 and

T is oxygen or sulfur and $R_4$ and $R_5$ independently of one another are hydrogen or $C_1$–$C_{13}$alkyl, and $R_4$ is additionally phenyl, or if a is 3

$R_1$ is

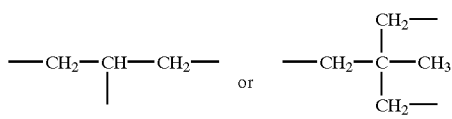

or if a is 4

$R_1$ is $C(CH_2—)_4$.

3. A product according to claim 1, where in the compound of the formula II $R_7$ is methyl or tert-butyl, and $R_8$ is hydrogen or methyl, and Q is —$CH_2CH_2$—.

4. A product according to claim 3, where $R_7$ is tert-butyl.

5. A product according to claim 1, where in the compound of the formula IIIa and the compound of the formula IIIb G is —$OCH_3$ and $R_9$ is $C_7$–$C_{20}$alkyl, $C_{12}$–$C_{24}$alkenyl, $C_8$–$C_{22}$hydroxyalkyl or $C_8$–$C_{22}$hydroxyalkenyl.

6. A product according to claim 1, where in the compound of the formula IV

L is sulfur,

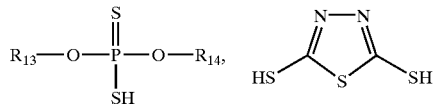

or $C_{18}$alkane, where $R_{13}$ and $R_{14}$ independently of one another are isopropyl or isooctyl.

7. A product according to claim 1, where the compound of the formula I is pentaerythritol, thiodiethylene glycol, 1,4-butanediol, 1,2-propanediol, diethylene glycol, triethylene glycol, 1,1,1-tris(hydroxymethyl)ethane, 1,1,1-tris(hydroxymethyl)propane, 2,2-dimethyl-1,3-propanediol or glycerol, the compound of the formula II is methyl 3-(3',5'-di-tert-butyl-4'-hydroxyphenyl)propionate or methyl 3-(3'-tert-butyl-4'-hydroxy-5'-methylphenyl)propionate, the compound of the formula IIIa is methyl pelargonate or methyl laurate and the compound of the formula IIIb is 2-dodecenylsuccinic anhydride, and the compound of the formula IV is an alkane of 12 to 18 carbon atoms.

8. A product according to claim 1, in which the molar ratio of components a), b), c) and, if used, d) is from 0.1:0.1:1:0.1 to 15:30:1:10.

9. A product according to claim 1, in which the proportion by weight of the active group E-1

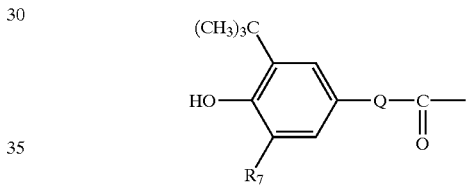

(E-1) is from 10 to 95% by weight.

10. A product according to claim 1, where the compound of the formula is glycerol.

11. A product according to claim 1, where the compound of the formula IIIa is methyl pelargonate or methyl laurate.

12. A product according to claim 1, where the compound of the formula IIIb is 2-dodecenylsuccinic anhydride.

13. A product according to claim 1, where component d) is an alkane of 12 to 20 carbon atoms.

14. A product obtainable by reacting the components a), b), c) and d) defined in claim 1, where all four components are introduced initially and reacted simultaneously.

15. A product obtainable by reacting the components a), b) and c), defined in claim 1, where all three components are introduced initially and reacted simultaneously.

16. A product according to claim 15, where component d) is added after the reaction of components a), b) and c).

17. A product obtainable by reacting the components a), b) and d), defined in claim 1, where all three components are introduced initially and reacted simultaneously.

18. A product according to claim 17, where component c) is added after the reaction of components a), b) and d).

19. A product obtainable by reacting the components a), c) and d), defined in claim 1, where all three components are introduced initially and reacted simultaneously.

20. A product according to claim 19, where component b) is added after the reaction of components a), c) and d).

21. A product obtainable by reacting the components a) and b), defined in claim 1, where both components are introduced initially and reacted.

22. A product according to claim 21, where components c) and d) are added after the reaction of components a) and b).

23. A product obtainable by reacting the components a) and c), defined in claim 1, where both components are introduced initially and reacted.

24. A product according to claim 23, where components b) and d) are added after the reaction of components a) and c).

25. A product according to claim 1, where components a) and c) are reacted with methyl 3-(3',5'-di-tert-butyl-4'-hydroxyphenyl)propionate in a $C_{12}$–$C_{18}$alkane.

26. A product according to claim 1, where the proportions of compounds of the formula I to II and III are chosen such that the number of free OH groups of the compounds of the formula I lies within the range from 0.1 to 3.0 equivalents per kilogram of product.

27. A product according to claim 1, where the proportions of compounds of the formula I to II and III are chosen such that the number of free OH groups of the compounds of the formula I lies within the range from 0.1 to 2.5 equivalents per kilogram of product.

28. A composition comprising a) an organic material subject to oxidative, thermal or light-induced degradation, and b) at least one product according to claim 1.

29. A composition according to claim 28, in which component a) is a fuel, a lubricant, a hydraulic fluid, a metalworking fluid or a synthetic polymer.

30. A composition according to claim 28, in which component a) is a hydrocarbon fuel, an oxygen-containing fuel or a mixture thereof.

31. A composition according to claim 28, in which component a) is a lubricant from the series of the mineral oils or of the synthetic oils, or is a mixture thereof.

32. A composition according to claim 28, in which component a) is a synthetic polymer.

33. A composition according to claim 28, comprising further additives in addition to components a) and b).

34. A composition according to claim 33, comprising amine antioxidants as further additives.

35. A method of stabilizing fuels, polymers or oils against oxidative, thermal or light-induced degradation, which comprises incorporating into them a product according to claim 1.

\* \* \* \* \*